United States Patent Office 3,704,233
Patented Nov. 28, 1972

3,704,233
O-ACYL-LYSERGOLS AND PROCESS FOR PREPARING THEM
Eckart Eich, Marienborn, and Hans Rochelmeyer, Mainz, Germany, assignors to Farbwerke Hoechst Aktiengesellschaft vormals Meister Lucius & Bruning, Frankfurt am Main, Germany
No Drawing. Filed July 14, 1970, Ser. No. 54,861
Claims priority, application Germany, July 17, 1969,
P 19 36 410.4
Int. Cl. C07d 43/20
U.S. Cl. 260—285.5       5 Claims

ABSTRACT OF THE DISCLOSURE

O-acyl-lysergols of the formula

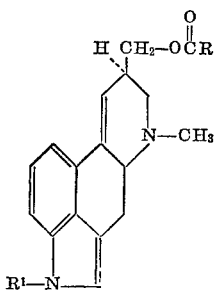

and their salts with non-toxic acids, which compounds show uterus-contracting and serotonin-antagonistic activity, wherein R is alkyl, haloalkyl, hydroxyalkyl, lower alkoxyalkyl, amino, mono- or di-lower alkylamino, tetramethyleneimino, pentamethyleneimino, alkenyl, cycloalkyl, cycloalkylalkyl, alkylcycloalkyl, phenylalkyl, or furyl; and $R^1$ is hydrogen or lower alkyl. Method for making the same by reaction of corresponding elymoclavines or lysergols with an acid, RCOOH, or an ester-forming derivative thereof.

---

The present invention relates to O-acyl-lysergols of the Formula I

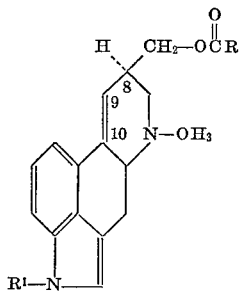

and their salts with non-toxic acids, in which R represents alkyl having 1 to 8 carbon atoms and which may be substituted by one or several halogen atoms, hydroxy, lower alkoxy, amino, mono- or di-lower alkylamino, tetramethyleneimino or pentamethyleneimino groups, alkenyl containing 4 to 8 carbon atoms, cycloalkyl having 3 to 8 carbon atoms, cycloalkylalkyl or alkylcycloalkyl having 3 to 8 ring carbon atoms and 1 to 3 carbon atoms in the lateral chain, phenylalkyl having 1 to 3 carbon atoms in the lateral chain, or furyl; and $R^1$ represents hydrogen or an alkyl group having 1 to 4 carbon atoms.

The present invention further relates to a process for the manufacture of the compounds of the Formula I, wherein elymoclavine (II) or lysergol (III) or their $N_1$-alkyl derivatives are reacted with functional derivatives of carboxylic acids of the formula R—COOH. If desired or required the compounds so obtained are alkylated in $N_1$-position and, if desired or required, the compounds obtained are converted into physiologically tolerated salts of acids.

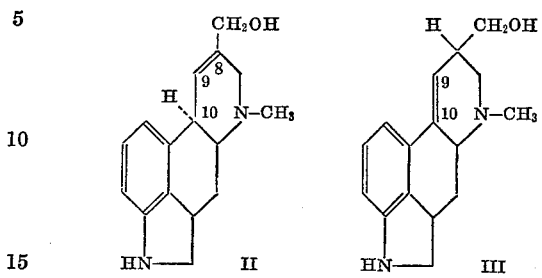

In the products of the invention of the Formula I, the group R may be derived, for example, from the following carboxylic acids: alkanoic acids such as propionic acid, butyric acid, valeric acid, caproic acid, isobutyric acid, 2- and 3-methylbutyric acid, 2- and 3-ethylbutyric acid, 2,2- or 3,3-dimethylbutyric acid, 2-ethyl-2-methyl-propionic acid, 2,2-dimethyl-propionic acid, 2,2- or 3,3-dimethyl- or -diethyl- or -methyl-ethyl-valeric acid; cycloalkanecarboxylic acids such as cyclopropane-, cyclobutane-, cyclopentane-, cyclohexane-, cycloheptane-, cyclooctane-carboxylic acid; 1- or 2- or 3-methyl-cyclopentane-carboxylic acid, 1- or 2- or 3- or 4-methyl- or -ethyl-cyclohexane-carboxylic acid, 4-isopropyl-, 4-n-propyl-, 4-n-butyl- or 4-isobutyl-cyclohexane-carboxylic acid; cyclopentyl- or cyclohexyl-acetic acid or -propionic acid; alkenoic acids such as vinyl-acetic or crotonic acid, hydroxy- or alkoxy-alkanoic acids such as glyceric or lactic acid, dimethoxy-propionic or 2-methoxymethyl-butyric acid; amino-acids such as alanine, valine, leucine, isoleucine; phenyl-acetic acid and β-phenyl-propionic acid; and pyromucic acid. Particularly preferred are cycloaliphatic and branched aliphatic groups.

The esterification is carried out in known manner by heating the components in the presence of a tertiary organic base, preferably pyridine. As functional derivatives of carboxylic acids of the formula R—COOH, especially the halides and anhydrides, furthermore esters, mixed anhydrides, and azides, are suitable.

In case elymoclavine or $N_1$-alkyl-elymoclavines are used, a surprising spontaneous partial or complete shift of the double bond from the 8 (9)- to the 9 (10)-position takes place at the same time, with formation of the lysergol configuration. This is evidenced by chromatography since $\Delta^{9,10}$-ergolene derivatives show an intensive blue fluorescence under ultraviolet light, whereas $\Delta^{8,9}$-ergolene derivatives show no fluorescence. The shift of the double bond can be completed by catalytic activation, for example by exposing the reaction mixture to neon light or ultraviolet light, suitably under a nitrogen atmosphere, or by slow filtration of the mixture of isomers through a column of aluminum oxide. The shifting proceeds even faster if the mixture of isomers is stirred or shaken with heating in inert organic solvents with activated aluminum oxide, active charcoal, or noble metal catalysts (palladium, rhodium, platinum) on carrier substances (charcoal, $BaSO_4$, $CaCO_3$), or metal oxide/sorbent catalysts such as $Cr_2O_3/Al_2O_3$.

If desired, the products of the invention can be converted into their salts with physiologically tolerated acids. As such acids, hydrochloric acid, hydrobromic acid, sulfuric acid, phosphoric acid, tartaric acid, maleic acid, methane-sulfonic acid and ethane-sulfonic acid may be used.

For preparing $N_1$-alkyl-O-acyl-lysergols, it is also possible to alkylate in the $N_1$-position O-acyl-lysergols obtained in the first reaction stage, instead of starting from corresponding $N_1$-alkyl-lysergols or $N_1$-alkyl-elymoclavines. For this purpose, known processes may be used, for example reaction with alkyl iodides in a solution of potassium in liquid ammonia [cf. Troxler et al., Helv. chim. Acta 40, 1721 (1957)].

The products of the invention have valuable pharmacological properties and are distinguished in particular by a strong uterus-contracting action. Moreover, they have a serotonin-antagonistic action which is higher, especially with the $N_1$-alkyl derivatives, than that of known pharmaceuticals. The pharmacological tests were carried out in the usual manner on the isolated uterus of a rat with ergometrine as standard substance (pre-treatment of the rats with diethyl-stilbestrol 24 hours before). O-DL-2-methyl-butyryl-lysergol, O-pivaloyl-lysergol (=2,2-dimethyl-propionyl-lysergol) and the corresponding ester with cyclobutane-carboxylic acid were found to be especially active in this respect. The anti-serotonin activity was proved on an isolated stomach of the rat in vitro and in the Wooley test in vivo. In this respect, especially $N_1$-methyl derivatives such as O-DL-2-methyl-butyryl-$N_1$-methyl-lysergol, were found to be highly active. By reason of their properties, the products of the invention may be used especially in obstetrics, for example for inducing the expulsion of the placenta; by reason of their serotonin-antagonistic action they may be used, for example, for the treatment of heavy migraine. The products may be administered perorally or parenterally, the doses administered being in the case of the uterus-contracting substances in the range of from 0.2 to 0.5 mg. (p.o., i.v., i.m.) and for the treatment of migraine in the range of from 4 to 6 mg. (p.o.).

The following examples illustrate the invention:

EXAMPLE 1

O-DL-2-methyl-butyryl-lysergol (a) 5 g. of lysergol were dissolved at the boiling temperature in 200 ml. of absolute pyridine. After cooling to 70° C., 4.8 g. of DL-2-methyl-butyryl chloride were added dropwise in portions, while shaking and while maintaining the temperature at 70° C. When the reaction was complete, the reaction mixture was poured into bicarbonate-containing ice water and extracted by shaking with methylene chloride. The extract was concentrated to dryness and extracted with boiling heptane. Upon cooling, the ester crystallized. It was recrystallized from acetone and was then found to melt at 183–185° C. with decomposition.

In analogous manner there were obtained:

| | $R_1$=H; R= |
|---|---|
| (b) O-propionyl-lysergol | $CH_2CH_3$ |
| (c) O-butyryl-lysergol | $CH_2CH_2CH_3$ |
| (d) O-valeryl-lysergol | $CH_2CH_2CH_2CH_3$ |
| (e) O-isobutyryl-lysergol | $CH(CH_3)_2$ |
| (f) O-isovaleryl-lysergol | $CH_2CH(CH_3)_2$ |
| (g) O-2-methylvaleryl-lysergol | $CH(CH_3)CH_2CH_2CH_3$ |
| (h) O-3-methylvaleryl-lysergol | $CH_2CH(CH_3)CH_2CH_3$ |
| (i) O-4-methylvaleryl-lysergol | $HC_2CH_2CH(CH_3)CH_3$ |
| (k) O-2-ethylcaproyl-lysergol | $CH(C_2H_5)CH_2CH_2CH_2CH_3$ |
| (l) O-2,2-dimethylbutyryl-lysergol | $C(CH_3)_2CH_2CH_3$ |
| (m) Cyclopropane-carboxylic acid ester of lysergol, |  |
| (n) Cyclopentanecarboxylic acid ester of lysergol, |  |
| (o) Cyclohexanecarboxylic acid ester of lysergol | 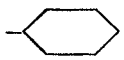 |
| (p) Pyromucic acid ester of lysergol |  |
| (q) O-cyclohexyl-acetyl-lysergol | 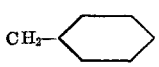 |

| | $R_1$=H; R= |
|---|---|
| (r) O-phenylacetyl-lysergol | $CH_2$—⌬ |
| (s) O-β-phenylpropionyl-lysergol | $CH_2CH_2$—⌬ |
| (t) O-methoxyacetyl-lysergol | $CH_2OCH_3$ |
| (u) O-dimethylacryloyl-lysergol | $CH=C(CH_3)$ |

EXAMPLE 2

Cyclobutane-carboxylic acid ester of lysergol 5 g. of lysergol were dissolved at the boiling temperature in 200 ml. of absolute pyridine. After cooling to 70° C., 4.8 g. of cyclobutane-carboxylic acid chloride were added dropwise in portions, while shaking and while maintaining the temperature at 70° C. The reaction mixture was worked up in the usual manner and extracted by shaking with methylene chloride. The extract was concentrated to dryness and extracted with boiling heptane. Upon cooling, the ester crystallized. It was recrystallized from acetone and was then found to melt at 200–202° C. with decomposition.

EXAMPLE 3

O-crotonoyl-lysergol 5 g. of lysergol were dissolved at the boiling temperature in 200 ml. of absolute pyridine. After cooling to 70° C., 4.2 g. of crotonoyl chloride were added dropwise in portions, while shaking and while maintaining the temperature at 70° C. The whole was stirred for 10 minutes at 70° C. and worked up in the manner described in Example 1. The ester was then recrystallized from benzene and was found to melt at 214–216° C. with decomposition.

EXAMPLE 4

O-2-ethylbutyryl-lysergol 10 g. of elymoclavine were dissolved at boiling temperature in 150 ml. of absolute pyridine. After cooling to room temperature, 10.8 g. of 2-ethylbutyryl chloride were added dropwise in portions. The whole was allowed to stand for 12 hours, the mixture of isomers was worked up in the usual manner and extracted by shaking with methylene chloride. The organic phase was concentrated to dryness, the residue was pulverized and, in order to complete isomerization, dissolved or suspended in benzene and the whole was introduced in a column filled with neutral aluminum oxide. The column was slowly eluted with benzene; the eluate contained 2-ethylbutyryl-lysergol which after recrystallization from benzene was found to melt at 170–171° C. with decomposition.

EXAMPLE 5

O-pivaloyl-lysergol 10 g. of elymolcavine were dissolved at boiling temperature in 150 ml. of absolute pyridine. After cooling to room temperature, 9.6 g. of pivoaloyl chloride were added dropwise in portions. The whole was allowed to stand for 12 hours. The mixture of isomers was then worked up in the usual manner and extracted by shaking with methylene chloride. The organic phase was concentrated to dryness, pulverized and, in order to complete isomerization, dissolved in benzene at 40° C., combined at a ratio of 1:15 (ester:sorbent) with neutral aluminum oxide and stirred for 20 minutes at 40° C. or shaken. The O-pivaloyl-lysergol was then freed from sorbent by elution with methanol. After concentration to dryness, it was recrystallized from benzene. The ester was found to melt at 176–177° C. with decomposition.

EXAMPLE 6

O-n-caproyl-lysergol 10 g. of elymoclavine were dissolved at boiling temperature in 150 ml. of absolute pyridine. After cooling to room temperature, 10.8 of caproyl chloride were added dropwise in portions. The whole was allowed to stand for 12 hours. The mixture of isomers was then worked up in the usual manner and extracted by shaking with methylene chloride. The organic phase was concentrated to dryness, pulverized and, in order to complete isomerization, dissolved in benzene at 40° C., combined at a ratio of 1:15 (ester:sorbent) with neutral aluminum oxide and stirred or shaken for 20 minutes at 40° C. The O-n-caproyl-lysergol was then freed from sorbent by elution with methanol. After concentration to dryness, the compound was recrystallized from benzene. The ester was found to melt at 178–179° C. with decomposition.

EXAMPLE 7

O-DL-2-methylbutyryl-$N_1$-methyl-lysergol-tartrate 5.3 g. of $N_1$-methyl-lysergol were dissolved at boiling temperature in 200 ml. of absolute pyridine. The solution was allowed to cool to about 70° C. and at this temperature, 4.8 g. of DL-2-methyl-butyryl chloride were added dropwise in portions, while shaking. After cooling, the reaction mixture was poured into bicarbonate-containing ice-water, extracted with methylene chloride and the extract was evaporated to dryness. The residue was dissolved in a solution of 2.5% of tartaric acid. Upon standing overnight in a refrigerator, the tartrate precipitated and, after recrystallization from acetone, it was found to melt at 157–159° C.

EXAMPLE 8

O-pivaloyl-$N_1$-methyl-lysergol 10.6 g. of $N_1$-methyl-elymoclavine were dissolved at the boiling temperature in 150 ml. of pyridine. After cooling to room temperature, 9.6 g. of pivaloyl chloride were added dropwise in portions and the whole was worked up as described in Example 5.

EXAMPLE 9

O-DL-2-methyl-butyryl-$N_1$-methyl-lysergol-tartrate 8 g. of potassium were dissolved in 1.5 l. of dry liquid ammonia and the blue solution was discolored with the just required amount of iron-III nitrate. Then, 50 g. of O-DL-2-methyl-butyryl-lysergol were added and the whole was stirred until complete dissolution. Subsequently 29.5 g. of methyl iodide, dissolved in 50 ml. of absolute ether, were added dropwise to the reaction mixture. The temperature was kept at −40° to −50° C. and stirring was continued for half an hour. The ammonia was then evaporated and the residue was taken up in ether. The insoluble residue was rejected. The etheral solution was extracted by shaking with 2.5% aqueous solution of tartaric acid and the aqueous phase was washed twice with ether. The whole was rendered alkaline with sodium bicarbonate and then extracted with chloroform in a base. After removal of the solvent, an oily residue remained behind which was combined with an excess of 2.54% aqueous tartaric acid. After allowing the whole to stand for several hours in the cold, the tartrate separated in the form of a voluminous colorless precipitate. The crude product was recrystallized at first from water and then from acetone. Melting point: 157–159° C.

We claim:
1. An O-acyl-lysergol of the formula

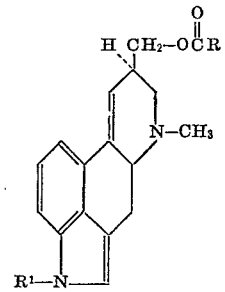

and its salts with non-toxic acids, wherein $R^1$ is hydrogen or methyl and R is alkyl having 1 to 8 carbon atoms; alkyl having 1 to 8 carbon atoms substituted with a monoalkylamino or dialkylamino group having 1 to 2 carbon atoms, halo, hydroxy, or methoxy; phenylalkyl having 1 to 3 carbon atoms in the alkyl chain; or furyl.
2. O-DL-2-methyl-butyryl-lysergol.
3. O-pivaloyl-lysergol.
4. O-cyclobutanecarboxyl-lysergol.
5. O-DL-2-methylbutyryl-$N_1$-methyl-lysergol-tartrate.

References Cited

UNITED STATES PATENTS

| | | | |
|---|---|---|---|
| 3,155,667 | 11/1964 | Camerino et al. | 260—285.5 |
| 3,232,942 | 1/1966 | Hofmann et al. | 260—285.5 |
| 3,236,852 | 2/1966 | Bernardi | 260—285.5 |
| 3,014,909 | 12/1961 | Rutschmann | 260—28.55 |

FOREIGN PATENTS

| | | | |
|---|---|---|---|
| 1,439,953 | 4/1966 | France | 260—285.5 |

DONALD G. DAUS, Primary Examiner

U.S. Cl. X.R.

204—158 R; 424—261